United States Patent
Guo et al.

(10) Patent No.: US 8,550,374 B2
(45) Date of Patent: Oct. 8, 2013

(54) VEHICLE HEADLIGHT CLEANING APPARATUS

(75) Inventors: Tianzhong Guo, Shanghai (CN); Chao Wang, Shanghai (CN); Minghua Zhu, Shanghai (CN)

(73) Assignee: Shanghai Koito Automotive Lamp Co., Ltd., Jiading, Shanghai (CN)

( * ) Notice: Subject to any disclaimer, the term of this patent is extended or adjusted under 35 U.S.C. 154(b) by 415 days.

(21) Appl. No.: 13/056,471

(22) PCT Filed: Apr. 6, 2010

(86) PCT No.: PCT/CN2010/071577
§ 371 (c)(1),
(2), (4) Date: Jan. 28, 2011

(87) PCT Pub. No.: WO2011/026325
PCT Pub. Date: Mar. 10, 2011

(65) Prior Publication Data
US 2011/0277263 A1    Nov. 17, 2011

(30) Foreign Application Priority Data
Sep. 7, 2009   (CN) .......................... 2009 1 0195210

(51) Int. Cl.
B05B 1/10    (2006.01)
B60S 1/46    (2006.01)

(52) U.S. Cl.
USPC ..................... 239/284.2; 239/284.1; 239/570

(58) Field of Classification Search
USPC ................... 239/284.1, 284.2, 570; 15/250.001–250.003, 250.01–250.05

IPC ......................................... B60S 1/52,1/56, 1/60
See application file for complete search history.

(56) References Cited

U.S. PATENT DOCUMENTS

| | | | | |
|---|---|---|---|---|
| 3,703,017 | A * | 11/1972 | Edwards et al. | 15/250.02 |
| 4,230,276 | A * | 10/1980 | Tinder et al. | 239/229 |
| 4,955,543 | A * | 9/1990 | Orth et al. | 239/284.2 |
| 5,605,286 | A * | 2/1997 | Orth et al. | 239/284.2 |
| 5,762,271 | A * | 6/1998 | Lind et al. | 239/284.2 |
| 6,752,329 | B1 * | 6/2004 | Price | 239/284.2 |
| 7,182,276 | B2 * | 2/2007 | Sakai et al. | 239/284.2 |
| 7,448,554 | B2 * | 11/2008 | Sakai et al. | 239/284.2 |
| 7,699,244 | B2 * | 4/2010 | Sakai et al. | 239/284.2 |
| 8,113,444 | B2 * | 2/2012 | Litvinov et al. | 239/284.2 |
| 2006/0113404 | A1 * | 6/2006 | Sato et al. | 239/284.2 |
| 2008/0210780 | A1 * | 9/2008 | Discher et al. | 239/284.2 |

* cited by examiner

*Primary Examiner* — Len Tran
*Assistant Examiner* — Alexander M Valvis
(74) *Attorney, Agent, or Firm* — Global IP Services; Tianhua Gu (57) ABSTRACT

A main body of the cleaning apparatus is of a cylindrical structure and internally provided with a compression spring and a movable seal valve which is matched with the inner wall of a casing of the cleaning apparatus. When cleaning solution flows in the cleaning apparatus through a cleaning solution inlet on a base, the pressure of the cleaning solution overcomes the spring force of the compression spring and drives a transmission guide rod, the movable seal valve and a nozzle to move together, and the transmission guide rod stops when moving to a limit position. When cleaning is finished, the pressure of the cleaning solution disappears, the movable seal valve is closed under the function of the compression spring then the transmission guide rod retracts into the casing and closes.

11 Claims, 8 Drawing Sheets

VEHICLE HEADLIGHT CLEANING APPARATUS

CROSS REFERENCE TO RELATED PATENT APPLICATION

The present application is the US national stage of PCT/CN2010/071577 filed on Apr. 6, 2010, which claims the priority of the Chinese patent application No. 200910195210.X filed on Sep. 7, 2009, which application is incorporated herein by reference.

FIELD OF THE INVENTION

The invention relates to a vehicle headlight auxiliary apparatus, in particular to a vehicle headlight cleaning apparatus. The cleaning apparatus of the invention is especially suitable for cleaning gas discharge lamps.

BACKGROUND OF THE INVENTION

With a large number of gas discharge lamps applied in medium-and-high grade car market in China, the requirements on headlight safety is more and more strict standard. Therefore, most of Chinese medium-and-high grade cars are equipped with headlight cleaning apparatus. Especially, a headlight such as a gas discharge lamp is easy to be contaminated during running process and causes glare for a driver counterpart, and further might causes accident. Therefore, to equip a cleaning apparatus on a headlight of a gas discharge lamp is necessary; meanwhile, China has already compulsorily executed provision that a high-brightness light source must be equipped with a headlight cleaning apparatus.

So far, lots of relevant technologies are disclosed, such as the Japanese patent with publication No. JP2003285723, which disclosed a headlight cleaning apparatus; said headlight cleaning apparatus is provided with a cleaning solution spray port capable of sliding relative to a fixed part of a vehicle. Said headlight cleaning apparatus comprises a retractable sprayer with a spraying port arranged on one end of a cleaning cylinder; a piston partly inserted in the opening part of the cleaning cylinder and slidably arranged in the cleaning cylinder; a fixed piston which is arranged outside of the cleaning cylinder and provided with a fixing part for being fixed on the fixing part of the vehicle; an augmenter arranged between the piston and the fixed piston for pressing the retractable sprayer to said fixed part; an inner cylinder sleeve fixed on one end of the cleaning cylinder and capable of being slideably inserted in the fixed piston for closing said opening; a connection vent which is arranged on the inner cylinder sleeve, connects the inside and outside of the cleaning cylinder, can be used for discharging solution between the piston and the inner cylinder sleeve in the cleaning cylinder and can exhaust air in the cleaning cylinder along with the telescopic sliding movement of said retractable sprayer. With the help of hydraulic pressure of cleaning solution between said spraying port in the cleaning cylinder and the piston, the retractable sprayer stretches relative to the fixed piston, and in the extension state, the cleaning solution is sprayed out from said spraying port.

To prevent the invasion of rainwater, impurities and so on from entering into said headlight cleaning apparatus, said cleaning cylinder is sealed by seal components inside and outside. However, due to the interior and exterior seals, air can't cross the space between the piston and the seals freely. Additionally, with the going in and out of air, flow resistance (pressure loss) is increased dramatically, which results in cleaning cylinder hard to move freely relative to other fixed parts (such as the fixed piston).

To deal with above problems, said Japanese patent provided a headlight cleaning apparatus which can not only prevent the invasion of rainwater, etc, but can make the cleaning cylinder move freely relative to other fixed part (such as the fixed piston).

From disclosed content of said Japanese patent, the cleaning apparatus is equipped with the retractable sprayer; the piston partially inserted into the opening part of the cleaning cylinder and slideably arranged in the cleaning cylinder; the fixed piston which is arranged outside (inside) the cleaning cylinder and provided with the fixing part fixed on the fixed part of the vehicle body; the augmenter arranged between said piston and the fixed piston and capable of pressing the retractable sprayer to one side of the fixed part; the inner cylinder sleeve which is slideably inserted into said fixed piston and fixed on one end of the cleaning cylinder for closing said opening; and the connection vent that can discharge air in the cleaning cylinder. The augmenters (springs) are mounted on the sprayer and the fixed piston respectively, and said sprayer can be slideably inserted into one end of said fixed piston. Because the aim of the invention of said headlight cleaning apparatus is to prevent the invasion of rainwater, etc, the invention of said headlight cleaning apparatus focused on binding and matching between constructional elements and the vehicle body. Therefore, it is obvious that the cleaning apparatus of the contrasting invention is more complex in structure and complicated in manufacturing.

Furthermore, the fixed piston part of the cleaning apparatus disclosed by said Japanese patent is in a fixed state. the fixed piston part and the nozzle part are equipped with a small augmenting component (spring) respectively, the spring forces of the two small springs are applied on the piston and the nozzle, but only the nozzle slides relative to the piston part, then the nozzle part is under relative high load, and the efficiency of said nozzle is influenced by long time using, affecting the cleaning efficiency of the whole cleaning apparatus.

Moreover, the size of former vehicle cleaning apparatus is 200-300 mm in length, mostly over 100 g in weight. Thus, former cleaning apparatus is of a big structure, accordingly, the plaque size is bigger and assembly requirement is higher.

Considering that, the aim of the invention is to provide a cleaning apparatus with higher cleaning efficiency, simpler structure, lighter weight and more reliable operation. The vehicle headlight cleaning apparatus of the invention adopts an integral (single) spring composite structure, which makes said cleaning apparatus not only have simple structure, but decrease the load of cleaning solution with respect to a piston part and a nozzle part. Thus, the headlight cleaning apparatus of the invention has high cleaning efficiency, reliable running and long service life. Moreover, the cleaning apparatus of the invention is in light and handy structure and requires small plaque size and lower assembly requirement. The headlight cleaning apparatus is especially suitable for cleaning a gas discharge lamp.

SUMMARY OF THE INVENTION

To realize above purposes, the technical scheme of the invention is as following:

A vehicle headlight cleaning apparatus comprises a cylindrical casing body, a transmission guide rod arranged in the cylindrical casing body for the cleaning solution flowing, a nozzle assembly connected with the upper end part of the transmission guide rod, and a compression spring arranged in the cylindrical casing body; and the cleaning apparatus is characterized in that the bottom of the cylindrical casing body 5 is connected with a casing base 13 with a cleaning solution inlet 13-1, the transmission guide rod 8 is capable of sliding in the cylindrical casing body 5, the periphery of the transmission guide rod 8 close to the base is provided with a circular lug boss 8-1 with limiting function, the bottom 8-4 of the transmission guide rod 8 is connected with a transmission guide rod base 9, and the transmission guide rod 8 is provided with an opening structure 8-3 used for entry of the cleaning solution;

The compression spring 7 is positioned between the cylindrical casing body 5 and the exterior cylinder wall of the transmission guide rod 8. Both ends of the compression spring 7 are fixed on the inner side of the upper end part of the cylindrical casing body 5 and a spring fixing base 10 of the movable seal valve respectively. The lower end of the cylindrical casing body is provided with the movable seal valve. The movable seal valve is slideably arranged at the lower end part of the transmission guide rod 8 which is connected with the transmission guide rod base 9 in a propping mode; the movable seal valve comprises a spring fixing base 10 and a main seal ring 11 which are arranged at the bottom end inside the cylindrical casing body and sleeved on the lower end of the transmission guide rod 8.

a seal gasket (4) is arranged on the upper end part outside said cylindrical casing body (5), and the interior bottom of the seal gasket (4) is provided with an exhaust groove (4-3).

The vehicle cleaning apparatus based on the invention has the following cleaning process.

If the cleaning apparatus does not work, the movable seal valve is propped and tightly attached to the upper end of the transmission guide rod base 9 under an elastic force of the compression spring 7 and makes the interior of the transmission guide rod 8 and the movable seal valve in a watertight state.

If the cleaning apparatus is started, under the pressurizing, cleaning solution flows into an empty space consisting of the transmission guide rod base 9, the cylindrical casing body 5 and the main seal ring 11 through the cleaning solution inlet 13-1 of the cylindrical casing body base 13. To increase the pressure of the cleaning solution, with the increasing of the interior pressure of the cleaning solution, the compression force of the compression spring 7 and the friction force between the main seal ring 11 and the interior wall of the cylindrical casing body is overcome, therefore, the transmission guide rod 8, the nozzle holder 3 and the movable seal valve is driven to move upwards to the nozzle end.

Figure 7A:
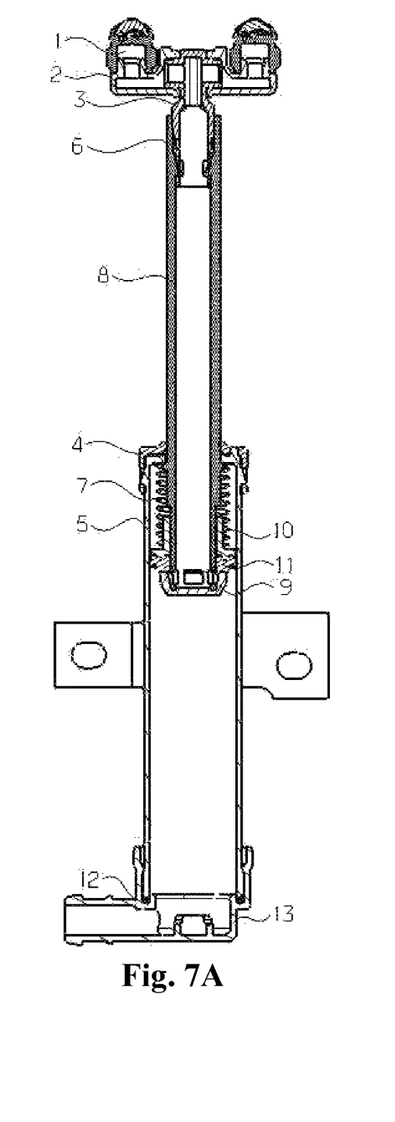
FIG. 7A is a schematic diagram of the headlight cleaning apparatus of the invention when it works (the movable seal valve is closed).

The interior pressure of the cleaning solution increases continuously, the transmission guide rod 8 keeps on moving upwards to the nozzle end till the lug boss 8-1 of the transmission guide rod 8 props against the inner wall of the top end of the cylindrical casing as shown in FIG. 7A. At the time, the transmission guide rod 5 stops moving upward to the nozzle end.

Figure 7B:
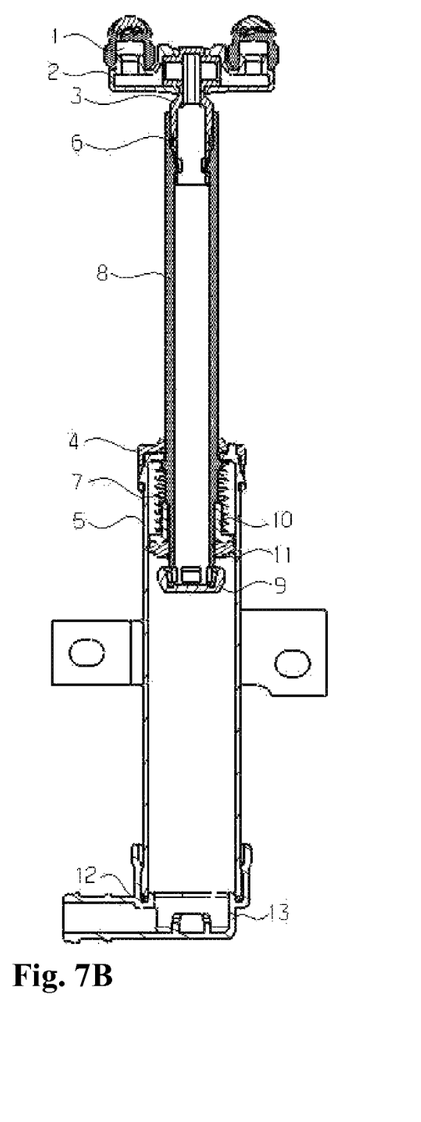
FIG. 7B is a schematic diagram of the headlight cleaning apparatus of the invention when it works (the movable seal valve is opened).
Figure 8:
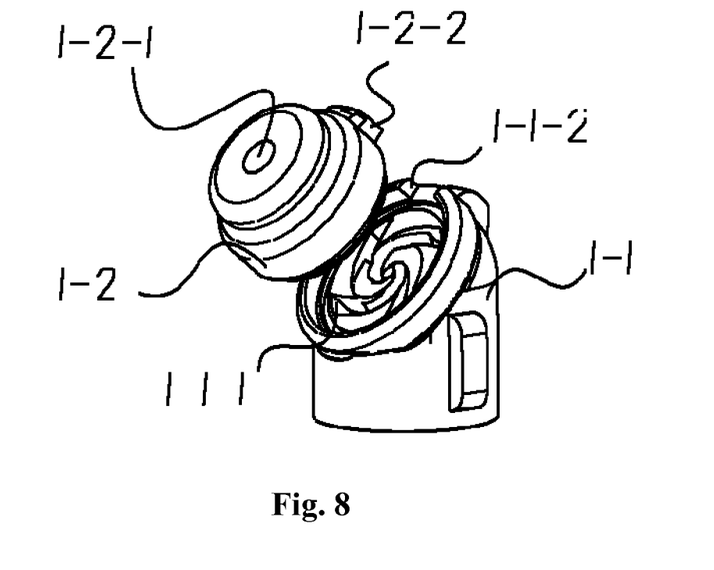
FIG. 8 is a structural drawing of the nozzle upper cover and the nozzle base of the headlight cleaning apparatus of the invention.
Figure 9:
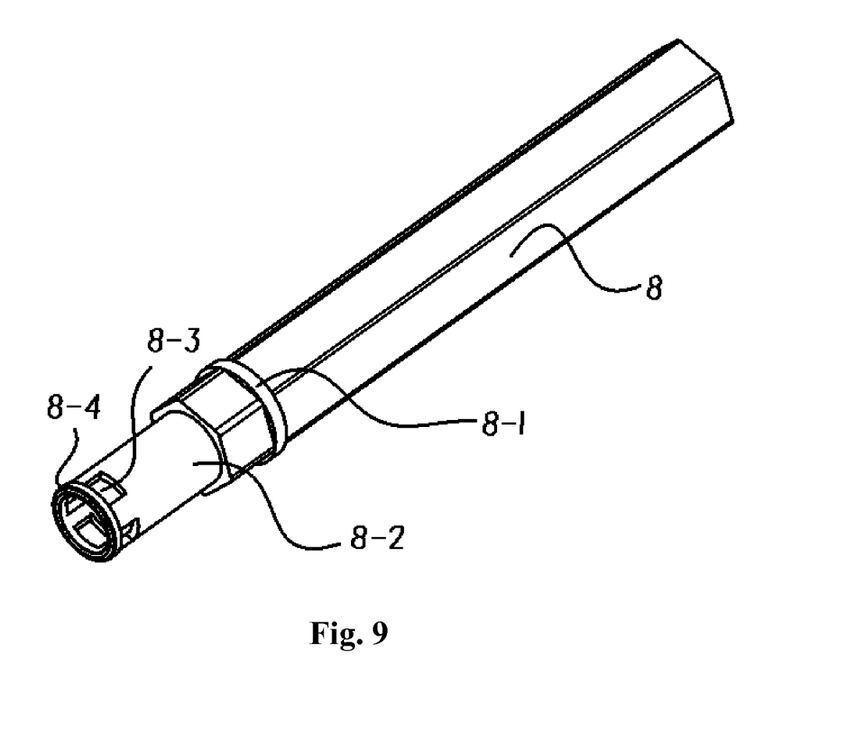
FIG. 9 is an axonometric drawing of the transmission guide rod of the headlight cleaning apparatus of the invention.
Figure 10:
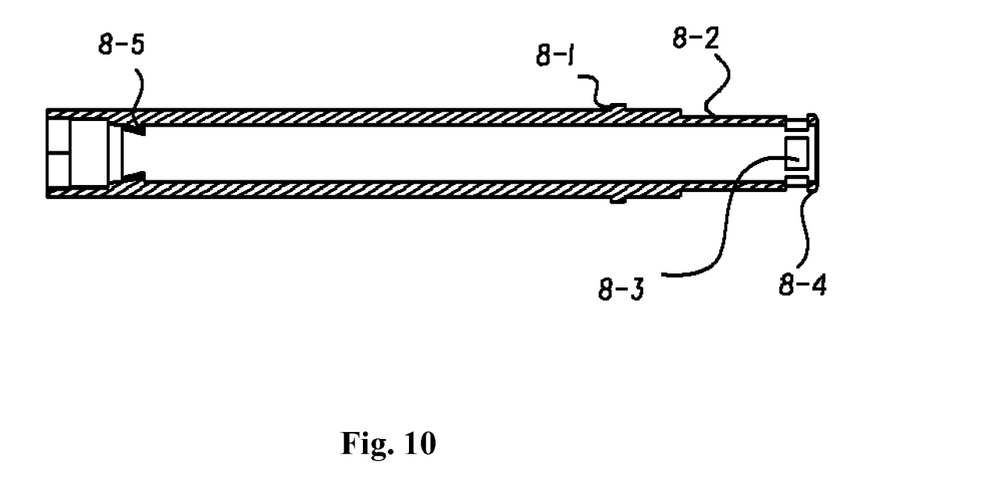
FIG. 10 is a sectional view of the transmission guide rod of the headlight cleaning apparatus of the invention.
Figure 11:
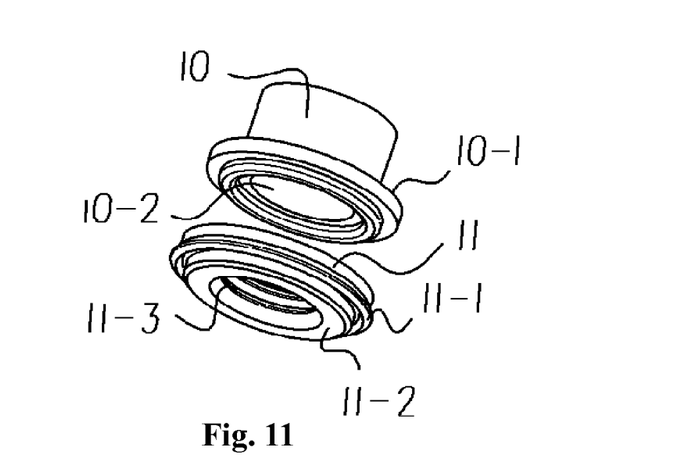
FIG. 11 is a structural drawing of the movable seal valve of the headlight cleaning apparatus of the invention.
Figure 12:
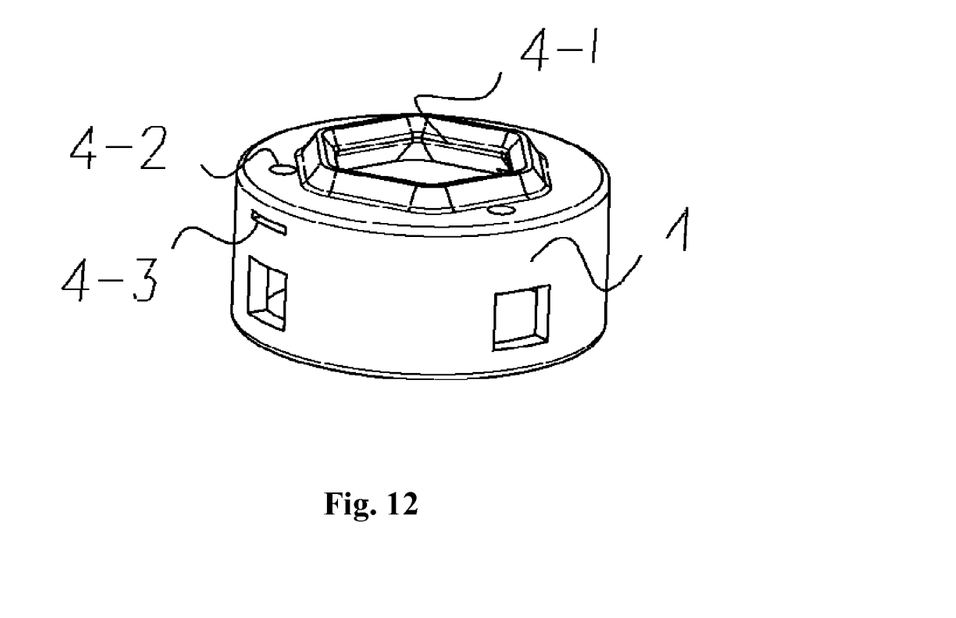
FIG. 12 is a structural drawing of the seal gasket of the headlight cleaning apparatus of the invention.
Figure 13:
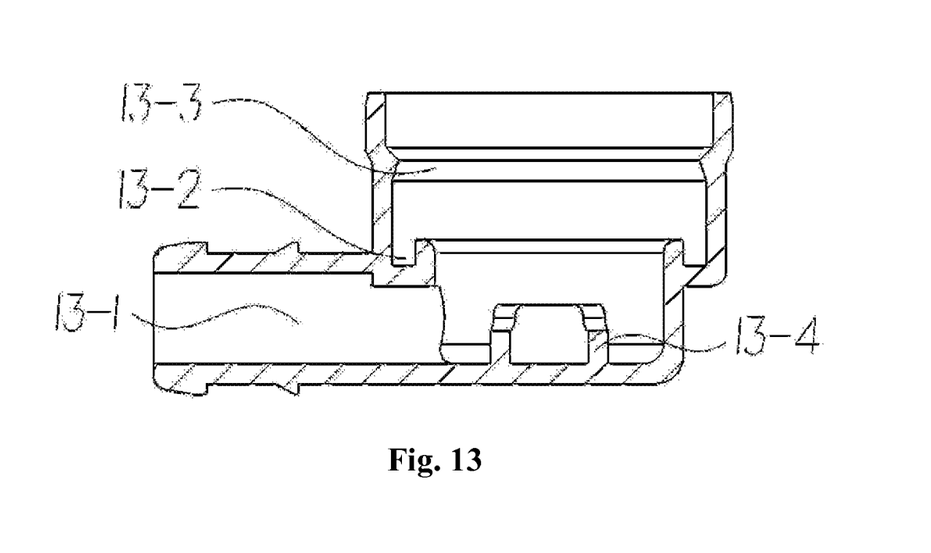
FIG. 13 is a sectional view of the base of the headlight cleaning apparatus of the invention.

The interior pressure of the cleaning solution increases continuously, the pressure is large enough to overcome the compression force of the compression spring 7, the friction force between the main seal ring 11 and the inner wall of the cylindrical casing body and the friction force between the main seal ring 11 and the outer wall of the transmission guide rod, the movable seal valve moves upward and then is opened, at that time, the pressure of the cleaning solution and the spring force of the compression spring reaches a balance, which makes the movable seal valve maintain the open state, as shown in FIG. 7B.

The cleaning solution flows into the transmission guide rod 5 from the opening 8-3 on the lower end of the transmission guide rod, flows through the transmission guide rod and into the nozzle holder 3, and finally is sprayed out from the nozzle 1 to realize the cleaning action.

After cleaning is finished, due to the disappear of the cleaning solution pressure, under the function of the elastic force of the compression spring 7, the movable seal valve firstly retracts back and closes to the transmission guide rod base 9, at that time, it goes back a seal state. And then, under the function of the compression spring 7, the transmission guide rod 8 overcomes the resistance of the cleaning solution and the friction force between the main seal ring 11 and the cylindrical casing body 5 to retract back into the casing till returning to the initial state.

Until then, the whole cleaning process is finished.

The vehicle headlight cleaning apparatus of the invention realizes extension of the transmission guide rod and opening of the movable seal valve with the aid of change of water pressure and different elastic forces of the compression spring in different compression lengths. Therefore, the headlight cleaning apparatus has simple structure, high efficiency and reliable operation in headlight cleaning.

Thus, the transmission guide rod base 9 is equipped with the main seal component 11 in a ring shape. The seal component 11 is inserted into the bottom of the spring fixing base 10 of the movable seal valve and can move along with the movable seal valve. The inner edge of the seal ring seals the transmission guide rod 8, and the outer edge seals the cylindrical casing body 5. If it does work, the lower part seals the transmission guide rod base 9.

To ensure multi-side seal, it adopts different structures on multi sides: the seal of the main seal ring and the inner wall of the cylindrical casing body is realized through a concave inclined plane on the main seal ring; under the same solution pressure, the leak tightness on the side is improved by utilizing impulsive force of the cleaning solution, and opening strength of the movable seal valve is improved, too. The leak tightness of the main seal ring on the side of the transmission guide rod is realized through double-layer seal of an M-shaped structure; on the transmission guide rod base, there is a prismatic projection which ensures the leak tightness of the side. Therefore, the headlight cleaning apparatus of the invention is light and easy to start and also convenient for free flow of the cleaning solution.

Preferably, according to the headlight cleaning apparatus of the invention, the nozzle assembly comprises the nozzle 1, the nozzle fixing base 2 and the nozzle holder 3, wherein the nozzle 1 is fixed on the nozzle fixing base 2 which is installed on the nozzle holder 3. The bottom end of the nozzle holder 3 is equipped with a buckle structure and is inserted in and fixed on the upper end part of the transmission guide rod 8.

Figure 3:
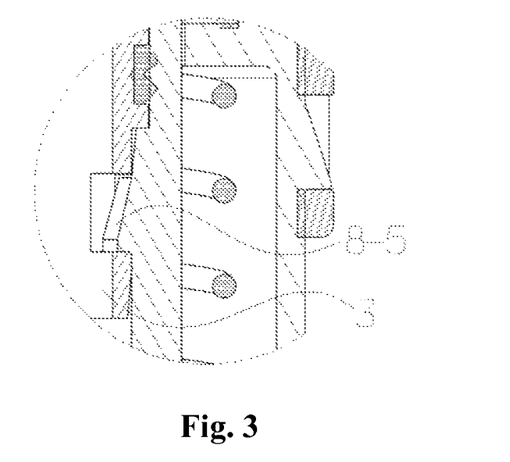
FIG. 3 is a partial enlarged drawing of part A of FIG. 1.

Preferably, according to the headlight cleaning apparatus of the invention, the periphery of the lower part of the nozzle holder 3 which is inserted in and fixed on the transmission guide rod 8 is equipped with a nozzle seal component 6 which is fixedly matched with the transmission guide rod 8 (FIG. 3).

From all we can see the leak tightness of nozzle is ensured, and there is no water leakage phenomenon.

Preferably, according to the headlight cleaning apparatus of the invention, the opening of the cylindrical casing body 5 close to the nozzle 1 is in a shape of a regular hexagon; the outer appearance of said transmission guide rod 8 is in a shape of a regular polygonal prism and in a shape of a cylinder inside.

Preferably, according to the headlight cleaning apparatus of the invention, the radial inside and outside peripheries of said main seal ring 11 has a sealing edge with prismatic embossment.

According to the headlight cleaning apparatus of the invention, because the main seal ring directly contacts with the inner wall of the cylindrical casing body, in order to ensure the inner wall the cylindrical casing body is smooth enough to prevent scratches on the inner wall, the cavity between the cylindrical casing body and the transmission guide rod must be cleaned. To prevent sewage or dust from entering the cavity between the cylindrical casing body and the transmission guide rod when the cleaning apparatus works, the connection reverse-buckle between the nozzle holder and the transmission guide rod is arranged at the interior wall of the transmission guide rod (FIG. 3).

Preferably, according to the headlight cleaning apparatus of the invention, the seal gasket 4 is arranged at the upper end part of outside the cylindrical casing body and encircles the transmission guide rod 8, the interior of gasket 4 has a regular-polygon-shaped inner hole, the upper edge of the inner hole has a prismatic embossment, there is an exhaust groove on the bottom in the seal gasket.

By taking above structures, while the transmission guide rod stretching out and retracting, it can be effectively insulated from impurities.

According to the headlight cleaning apparatus of the invention, the end of the cylindrical casing body close to the nozzle is provided with the seal gasket 4 which is fixed to and three lug bosses through the reverse-buckle outside the cylindrical casing body and is in an interference fit with the transmission guide rod. The cavity between tank and guide rod is guaranteed clean through this structure.

Preferably, according to the headlight cleaning apparatus of the invention, a seal ring 12 is arranged between the cylindrical casing body 5 and the base 13, meanwhile, on the outer side of the cylindrical casing body is provided with a flange which is in an interference fit with the inner wall of the base 13.

Thus, the base 13 can be assembled with the cylindrical casing body 5 at any angle.

Preferably, according to the headlight cleaning apparatus of the invention, said nozzle holder 3 is inserted into and fixed on the upper part of the transmission guide rod 8, the periphery of the nozzle holder 3 is provided with a nozzle seal component 6 which is matched with the interior wall of the transmission guide rod 8 in a sealing mode, the bottom part of the nozzle holder 3 is equipped with the buckle structure. The interior side of the transmission guide rod 8 is provided with the reverse-buckle structure 8-5.

Preferably, according to the headlight cleaning apparatus of the invention, the transmission guide rod base 9 is fixedly jointed with the flange structure 8-4 of the transmission guide rod.

Thus, it can be matched with the sealing side of the movable seal valve to realize resetting and sealing function while the cleaning apparatus stops working.

Preferably, according to the headlight cleaning apparatus of the invention, the nozzle 1 is formed by fixedly connecting a nozzle base 1-1 and a nozzle upper cover 1-2. The nozzle base 1-1 and the nozzle upper cover 1-2 are internally provided with spiral groove s 1-1-1 in even distribution, the spiral grooves of nozzle base 1-1 and the nozzle upper cover 1-2 are in one-one correspondence to form a complete circuit of cleaning solution.

Preferably, in the headlight cleaning apparatus according to the invention, there is a positioning groove 1-1-2 on the nozzle base 1-1; correspondingly, there is a positioning lug boss 1-2-2 on the nozzle upper cover 1-2, and the positioning grove is tightly matched with the positioning lug boss. A spraying port 1-2-1 arranged on the nozzle upper cover is a spraying port of the cleaning apparatus.

Preferably, the headlight cleaning apparatus according to the invention is 130-140 mm in length in the condition of working stroke of 75 mm, with a weight no more than 50 g.

The headlight cleaning apparatus according to the invention adopts an integral spring structure as a control part for the piston and the nozzle, which makes said cleaning apparatus simpler in structure. Therefore, the headlight cleaning apparatus of the invention has small and exquisite appearance, light weight, high cleaning efficiency, reliable operation and long service life. Since it has no connection hole for connecting the inside and outside of the cylindrical casing body, there is no such problem that rainwater, etc flows into the cleaning cylinder. Moreover, the headlight cleaning apparatus of the invention has small and exquisite structure; therefore it requires small front plaque size and lower assembly requirement. The headlight cleaning apparatus of the invention is especially suitable for cleaning headlights of gas discharge lamps.

Wherein, 1 indicates nozzles of the cleaning apparatus, 2 indicates nozzle fixing base, 3 indicates nozzle holder, 4 indicates seal gasket, 5 indicates cylinder casing body, 6 indicates nozzle seal ring, 7 indicates compression spring, 8 indicates transmission guide rod, 9 indicates transmission guide rod base, 10 indicates spring fixing base, 11 indicates main seal ring, components 10 and 11 form the movable seal valve, 12 indicates base seal ring, 13 indicates casing base, component 5 and 13 form the casing of the cleaning apparatus, 13-1 indicates water inlet of casing base, 8-3 indicates water inlet at lower end of the transmission guide rod, 8-5 indicates reverse-buckle of nozzle holder, and 13-4 indicates middle step of casing base.

DETAIL DESCRIPTION OF THE INVENTION

Next, the vehicle headlight cleaning apparatus of the invention is further described in details by combing the following attached figures and the embodiments.

Embodiment 1

A vehicle headlight cleaning apparatus comprises: a casing which is consisted of a main cylindrical casing body 5 and a casing base 13 connected with the main cylindrical casing body, a seal component 12 is arranged between the main cylindrical casing body 5 and the casing base 13, the base 13 is provided with a cleaning solution inlet 13-1 and steps for fixing a transmission guide rod base 9.

A transmission guide rod 8 is of a cylinder structure and provided with openings on the front and the rear sides; the front opening is in a shape of a regular hexagon, which has the function of guiding and is matched with a nozzle holder 3; the rear opening allows the entry of cleaning solution while a movable seal valve is opened and is fixedly connected with the transmission guide rod base. The rear end of the transmission guide rod 8 is provided with a lug boss 8-1 which has position limiting effect.

The lower end of the transmission guide rod 8 is equipped with the movable seal valve, and said movable seal valve comprises a spring base 10 and a main seal ring 11 and can slide freely on the bottom of the transmission guide rod.

The main seal component 11 is of a ring shape, the inner wall of the main seal component is tightly attached with the lateral side of the bottom of the transmission guide rod 8, the outer wall is tightly attached with the inner wall of the cylindrical casing body to move freely along with the movable seal valve, the bottom is tightly attached with the transmission guide rod base 9 when the cleaning apparatus does not work.

The exterior of the transmission guide rod 8 is equipped with a compression spring 7, both ends of said compression spring 7 are fixed on the inner side of the upper end of the cylindrical casing body 5 and the spring fixing base 10 of the movable seal valve respectively.

The spring fixing base 10 is a shape of a flange, which is hollow in the middle part and is matched with the transmission guide rod 8.

During assembly, the main seal ring 11 and the spring fixing base 10 firstly assembled to form the movable seal valve, then the movable seal valve is sleeved on the lower end of the transmission guide rod 8, and finally, the transmission guide rod base 9 and guide rod 8 are welded together to finish the assembly.

The nozzle holder 3 is inserted in and fixedly matched with the transmission guide rod 8; the end part of the nozzle holder 3 is equipped with a nozzle seal component 6 which is fixedly matched with the transmission guide rod 8.

Since the main seal ring slides closely on the inner wall of the cylindrical casing body while the cleaning apparatus works, it is necessary to prevent dust particles from going into the inside of the cleaning apparatus resulting in scratches on the inner wall. Therefore, a seal gaskets 4 is arranged outside the upper end of the cylindrical casing body.

While cleaning apparatus is in the initial position, the movable seal valve is tightly attached with the transmission guide rod base 9 under the function of the compression spring 7; the transmission guide rod base 9 is fitted tightly with a step 13-4 on the cylindrical casing body base under the function of the movable seal valve, at that time, the cleaning apparatus is in a closed state.

When the cleaning solution flows into the cleaning apparatus through the cleaning solution inlet 13-1 of the base 13, the transmission guide rod 8 together with the movable seal valve overcome the elastic force of the compression spring 7 and the friction force between the main seal ring and the inner wall of the cylindrical casing body to move upwards under the pressure of the cleaning solution. Before the transmission guide rod 8 moves to the longest end, the movable seal valve is tightly attached on the transmission guide rod base 9 under the function of the compression spring 7 to make the cleaning apparatus still in the closed state.

Figure 5:
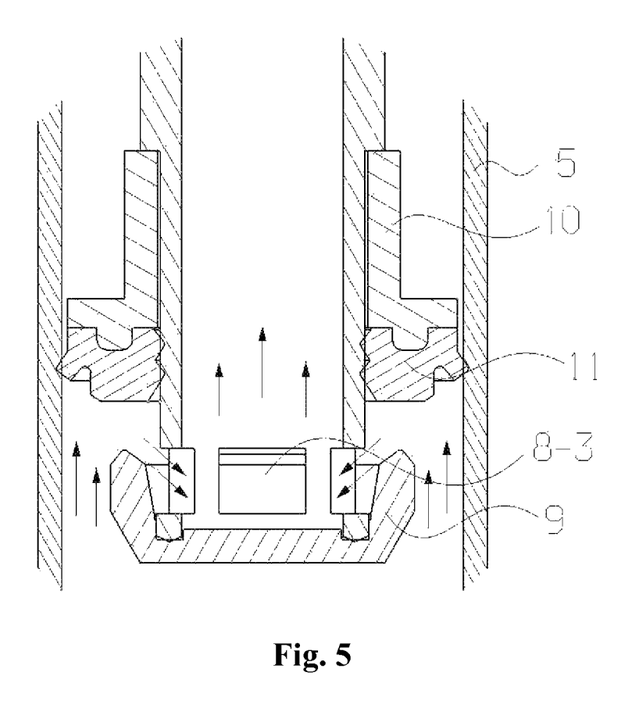
FIG. 5 is an enlarged schematic diagram of the movable seal valve of the headlight cleaning apparatus of the invention.
Figure 6:
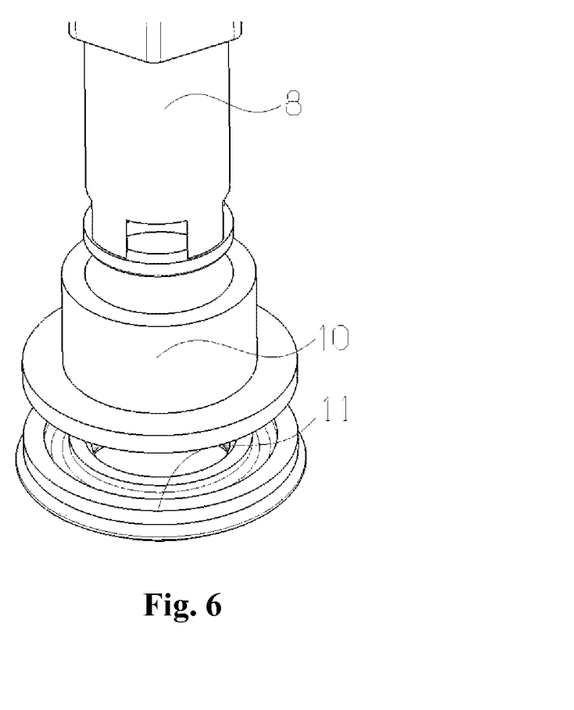
FIG. 6 is an assembly schematic diagram of the spring fixing base and the main seal component.

When the transmission guide rod 8 moves to the position as shown in FIG. 7A, the upper end of the cylindrical casing body 5 limits the transmission guide rod 8 at the position as shown in FIG. 7A under the limiting component 8-1 of the transmission guide rod. Because the cleaning apparatus is still in the closed state, the pressure of the cleaning solution increases continuously, and while the cleaning solution pressure is big enough to overcome the elastic force of the compression spring 7, the movable seal valve is opened gradually. While the movable seal valve moves to the position as shown in FIG. 7B, it stops moving and stays at the position as shown in FIG. 7B, the work circuit of the cleaning solution in the transmission guide rod 8 is opened, the cleaning solution flows into the transmission guide rod 8 (as shown in FIG. 5) through an opening 8-3 at the lower end of the transmission guide rod and is finally sprayed out from the nozzle to clean the headlight.

Figure 1:
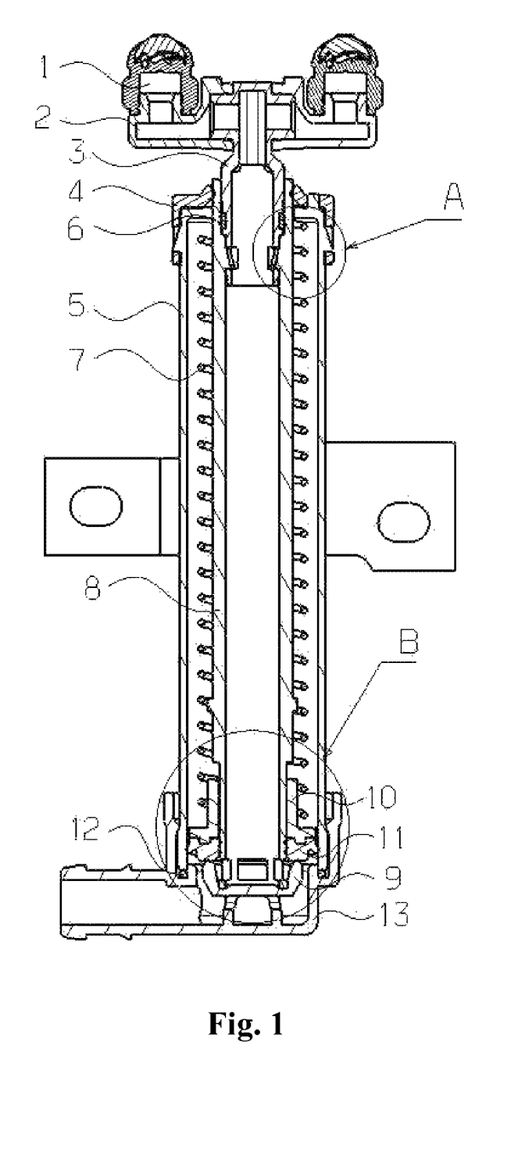
FIG. 1 is a profile chart of the vehicle headlight cleaning apparatus of the invention.
Figure 2:
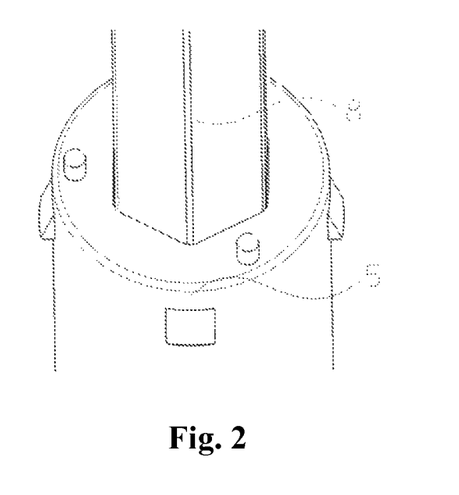
FIG. 2 is an appearance schematic diagram of the nozzle part of the headlight cleaning apparatus of the invention.

When the cleaning apparatus finishes working, because the pressure of the cleaning solution disappears, the movable seal valve firstly restores to the position as shown in FIG. 7A under the function of the compression spring 7, then the transmission guide rod 8 gradually retracts into the cylindrical casing body 5 till the position as shown in FIG. 1 under the function of the movable seal valve. The whole cleaning process of the cleaning apparatus is finished.

Here, the fixed joint between the nozzle holder 3 and the transmission guide rod 8 is realized through a reverse-buckle 8-5 on the transmission guide rod 8 and a reverse-buckle groove on the nozzle holder 3.

As shown in FIG. 3, in order to prevent dust from going into the cleaning apparatus while the transmission guide rod 8 stretches out, the reverse-buckle 8-5 is arranged inside the transmission guide rod, the nozzle holder 3 is inserted on the transmission guide rod, and this structure together with the seal gaskets 4 is good for dust-prevention protection of the cleaning apparatus.

Figure 4:
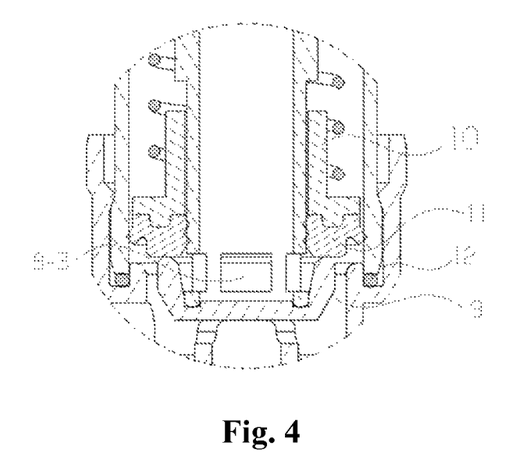
FIG. 4 is a partial enlarged drawing of part B of FIG. 1.

FIG. 4 shows the structure of the main seal ring 11. During the whole working process of the cleaning apparatus, the leak tightness of the cleaning apparatus and the opening of the movable seal valve completely depend on the main seal ring, so that we must guarantee the leak tightness of three sides of the main seal ring. In order to guarantee the leak tightness between the main seal ring 11 and the inner wall of the cylindrical casing body 5, a groove is additionally arranged on the side of the seal ring to form an elastic shoulder, so that during working the cleaning solution flows into the groove to increases the extruding force to the outer side, and in turn the leak tightness is improved; on the side of the transmission guide rod 8, the seal ring is of an M-shaped structure, and the leak tightness on the side is perfect because of double-layer sealing; on the side of the transmission guide rod base 9, the bottom of the main seal ring is a plane surface, a triangular lug boss is additionally arranged on the transmission guide rod base, thus the leak tightness of the side is realized through interference fit between the seal ring and the transmission guide rod base under the function of the compression spring.

The headlight cleaning apparatus manufactured based on the embodiment is 130-140 mm in length in the condition of working stroke of 75 mm, with a weight of 40-50 g.

Embodiment 2

As shown in FIG. 3, a vehicle headlight cleaning apparatus of the invention is manufactured in the same processes of embodiment 1 except that the reverse-buckle 8-5 of the transmission guide rod is provided with a hook and a nozzle seal ring 6 to guarantee that the nozzle holder is reliably fixed in the transmission guide rod 5.

Embodiment 3

The vehicle headlight cleaning apparatuses as embodiment 1 and embodiment 2 of the invention are installed at the bottom side of a passenger car headlight to make the cleaning nozzle face the signal face of the headlight and then carry out cleaning of the signal face. This is a convenient cleaning method with great cleaning effect.

Embodiment 4

Except for installing the vehicle headlight cleaning apparatus as embodiment 1 and embodiment 2 of the invention on the outer side of a passenger car headlight to make the cleaning nozzle face the signal face of the headlight, the vehicle headlight cleaning apparatus of the invention is manufactured in the same processes of embodiment 1 and carries out cleaning of the signal face. This is a convenient cleaning method with great cleaning effect.

Embodiment 5

Except for installing the vehicle headlight cleaning apparatuses as embodiment 1 and embodiment 2 of the invention on the bottom side of a passenger car headlight and making the cleaning apparatus covered by a car body plate which is opened along with the start of cleaning solution when the cleaning apparatus works, a vehicle headlight cleaning apparatus of the invention is manufactured in the same processes of embodiment 1 and carries out cleaning of the signal face of the headlight. This is a convenient cleaning method with great cleaning effect.

The headlight cleaning apparatus according to the invention adopts an integral spring structure as a control part for a piston and a nozzle, which makes said cleaning apparatus simpler in structure. Therefore, the headlight cleaning apparatus of the invention has small and exquisite appearance, high cleaning efficiency, reliable operation and long service life. Since it has no communication hole for connecting the inside and outside of a cleaning cylinder, there is no such problem that rainwater, etc flows into the inside of the cleaning cylinder. Moreover, the headlight cleaning apparatus of the invention has small and exquisite structure and requires small plaque size and lower assembly requirement. The headlight cleaning apparatus of the invention is especially suitable for cleaning headlights of gas discharge lamps.

What is claimed is:
1. A vehicle headlight cleaning apparatus comprising:
   a cylindrical casing body, a transmission guide rod arranged in the cylindrical casing body for the cleaning solution flowing, a nozzle assembly connected with the upper end part of the transmission guide rod, and a compression spring arranged in the cylindrical casing body;
   a bottom of the cylindrical casing body (5) is connected with a cleaning solution inlet (13-1) located in a casing base (13), the transmission guide rod (8) is capable of sliding in the cylindrical casing body (5), a periphery of the transmission guide rod (8) closing to the casing base is provided with a circular lug boss (8-1), a bottom (8-4) of the transmission guide rod (8) is connected with a transmission guide rod base (9), and the transmission guide rod (8) is provided with an opening structure (8-3) used for entry of the cleaning solution;
   The compression spring (7) is positioned between the cylindrical casing body (5) and the exterior cylinder wall of the transmission guide rod (8), Both ends of the compression spring (7) are fixed on the inner side of an upper end part of the cylindrical casing body (5) and a spring fixing base (10) of a movable seal valve respectively, the movable seal valve is slideably arranged at the lower end part of the transmission guide rod (8) which is connected with the transmission guide rod base (9) in a propping mode;
   the movable seal valve comprises the spring fixing base (10) and a main seal ring (11) which are arranged at the bottom end inside the cylindrical casing body and sleeved on the lower end of the transmission guide rod (8);
   a seal gasket (4) is arranged on the upper end part outside said cylindrical casing body (5), and the interior bottom of the seal gasket (4) is provided with an exhaust groove (4-3).

2. The vehicle headlight cleaning apparatus as claimed in claim 1 wherein the nozzle assembly comprises a nozzle (1), a nozzle fixing base (2) and a nozzle holder (3), the nozzle (1) is fixed on nozzle fixing base (2), the nozzle fixing base (2) is mounted on the nozzle holder (3), the bottom of the nozzle holder (3) is provided with a buckle structure and is inserted in and fixed on an upper end part of the transmission guide rod (8).

3. The vehicle headlight cleaning apparatus as claimed in claim 1, wherein an opening of the cylindrical casing body (5) near the nozzle (1) is in a shape of a regular hexagon, and the transmission guide rod (8) is in a shape of a regular polygonal prism in the external shape and in a cylindrical shape in the interior, so that a reliable and closed fit of the nozzle and the transmission guide rod is realized.

4. The vehicle headlight cleaning apparatus as claimed in claim 1, wherein the radial inside and outside peripheries of said main seal ring (11) are provided with prismatic seal projections.

5. The vehicle headlight cleaning apparatus as claimed in claim 1, wherein a seal gasket (4) is arranged on an upper end part inside side cylindrical casing body (5) and encircles the transmission guide rod (8), the seal gasket (4) has an equilateral polygon inner hole, the upper edge of the inner hole is provided with a prismatic protrusion, and the interior bottom of the seal gasket (4) is provided with an exhaust groove (4-3).

6. The vehicle headlight cleaning apparatus as claimed in claim 1, wherein a seal ring (12) is arranged between said cylindrical casing body (5) and the casing base (13), meanwhile, the outer side of the cylindrical casing body is provided with a flange which is in an interference fit with the inner wall of the casing base (13).

7. The vehicle headlight cleaning apparatus as claimed in claim 1, wherein said nozzle holder (3) is inserted and fixed on the lower part of the transmission guide rod (8), a periphery of the nozzle holder (3) is provided with a nozzle seal component (6) which is matched with the inner side of the transmission guide rod (8) in a sealing mode, a bottom of the nozzle holder (3) is provided with a buckle structure, and an inner side of the transmission guide rod (8) is provided with a reverse-buckle structure (8-5).

8. The vehicle headlight cleaning apparatus as claimed in claim 1, wherein the transmission guide rod base (9) is fixedly jointed with the flange (8-4) of the transmission guide rod.

9. The vehicle headlight cleaning apparatus as claimed in claim 1, wherein the nozzle (1) is assembled by a nozzle base (1-1) and a nozzle upper cover (1-2) which are fixedly connected together, the nozzle base (1-1) and the nozzle upper cover (1-2) are internally provided with spiral grooves (1-1-1) in uniform distribution, the spiral grooves of the nozzle base (1-1) and the nozzle upper cover (1-2) are in one-one corresponding relationship to form channels of cleaning solution.

10. The vehicle headlight cleaning apparatus as claimed in claim 1, wherein the nozzle base (1-1) has a positioning groove (1-1-2), a positioning lug boss (1-2-2) is arranged on the nozzle upper cover (1-2), the positioning lug boss is tightly matched with said positioning groove, a nozzle upper cover is provided with a spraying port (1-2-1) which is a spraying outlet of the cleaning apparatus.

11. The vehicle headlight cleaning apparatus as claimed in claim 1, wherein the size of said vehicle headlight cleaning apparatus is within 140 mm under the working condition of working stroke of 75 mm, with a weight of no more than 50 g.

* * * * *